(12) United States Patent
Kitamura

(10) Patent No.: US 11,042,733 B2
(45) Date of Patent: Jun. 22, 2021

(54) INFORMATION PROCESSING APPARATUS FOR TEXT RECOGNITION, NON-TRANSITORY COMPUTER READABLE MEDIUM FOR TEXT RECOGNITION PROCESS AND INFORMATION PROCESSING METHOD FOR TEXT RECOGNITION

(71) Applicant: FUJIFILM Business Innovation Corp., Tokyo (JP)

(72) Inventor: Takumi Kitamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 70 days.

(21) Appl. No.: 16/273,176

(22) Filed: Feb. 12, 2019

(65) Prior Publication Data

US 2020/0089945 A1 Mar. 19, 2020

(30) Foreign Application Priority Data

Sep. 18, 2018 (JP) .............................. JP2018-173596

(51) Int. Cl.
*G06K 9/00* (2006.01)
(52) U.S. Cl.
CPC ..... *G06K 9/00449* (2013.01); *G06K 2209/01* (2013.01)

(58) Field of Classification Search
None
See application file for complete search history.

(56) References Cited

U.S. PATENT DOCUMENTS

| 2008/0162603 | A1* | 7/2008 | Garg | ...................... G06F 40/117 |
| 2015/0169951 | A1* | 6/2015 | Khintsitskiy | ...... G06K 9/00483 382/182 |
| 2015/0213332 | A1* | 7/2015 | Fujiwara | ................ G06K 9/685 382/203 |

FOREIGN PATENT DOCUMENTS

| JP | 2012064195 | 3/2012 |
| JP | 2016212812 | 12/2016 |

\* cited by examiner

*Primary Examiner* — Justin P. Misleh
(74) *Attorney, Agent, or Firm* — JCIPRNET

(57) ABSTRACT

An information processing apparatus includes an acquiring unit, a confirming unit, and a controller. The acquiring unit acquires a text recognition result with respect to a first image showing a document and a certainty factor indicating a certainty of the text recognition result. The confirming unit confirms the text recognition result if the certainty factor is above or equal to a threshold value. The controller controls an output of a warning for the text recognition result with respect to the first image in a case where the text recognition result and a text recognition result with respect to a second image showing a relevant document related to the document do not match even when the certainty factor is above or equal to the threshold value.

11 Claims, 9 Drawing Sheets

FIG. 5

| YEAR XXXX  CURRENT STATUS OF SPECIAL CHILD BENEFIT | | | | | | DATE OF SUBMISSION: / / | |
|---|---|---|---|---|---|---|---|
| BENEFICIARY | FULL NAME *REGISTERED STAMP | Taro Fuji | | | STAMP | BIRTHDATE / / | |
| | ADDRESS TEL. NO. | 1-1-1 ZZ, YY CITY, XX PREFECTURE<br>123-456-789 | | | | MARITAL STATUS AND SPOUSE'S NAME | SINGLE/ MARRIED |
| | ...ADDRESS | ☐ WITHIN WARD  ☐ OUTSIDE WARD  ☐ ABROAD  ☐ OTHER | | | | SPOUSE'S OCCUPATION | ☐ NONE<br>☐ EMPLOYEE<br>☐ PUBLIC EMPLOYEE<br>☐ OTHER |
| | ATTRIBUTE | ☐ PARENT  ☐ GUARDIAN OF MINOR | | | | | |
| SUPPORTED CHILD / CHILDREN OF 18 YEARS OR YOUNGER | | FULL NAME | RELATIONSHIP | BIRTHDATE | LIVING STATUS | ADDRESS | |
| | 1 | Minato Fuji | Child | 6/26/2010 | (TOGETHER)/ SEPARATE | ☑ WITHIN WARD  ☐ OUTSIDE WARD | |
| | 2 | Mirai Fuji | Child | 12/12/2013 | (TOGETHER)/ SEPARATE | ☑ WITHIN WARD  ☐ OUTSIDE WARD | |
| | 3 | | | | TOGETHER/ SEPARATE | ☐ WITHIN WARD  ☐ OUTSIDE WARD | |
| | 4 | | | | TOGETHER/ SEPARATE | ☐ WITHIN WARD  ☐ OUTSIDE WARD | |
| | 5 | | | | TOGETHER/ SEPARATE | ☐ WITHIN WARD  ☐ OUTSIDE WARD | |
| BENEFICIARY'S PENSION FUNDS AND PLACE OF EMPLOYMENT | | | | | | | |
| ☐ WELFARE PENSION<br>☐ MUTUAL PENSION<br>☐ NATIONAL PENSION | | | | | | | |

SELECTION OF RELEVANT-DOCUMENT INFORMATION ☒

ITEM NAME : CHILD'S NAME 1

TEXT STRING INSCRIBED IN FORM: Minato Fuji

CHECK THIS ITEM IN SAME REGION FROM NEXT TIME AND ONWARD?

YES | NO

FIG. 11

*[Figure 11 shows a form-processing interface. The background form is labeled "YEAR XXXX CURRENT STATUS OF SPECIAL CHILD BENEFIT" (element 60) with fields for beneficiary information including FULL NAME "Taro Fuji", ADDRESS "1-1-1 ZZ, YY CITY, XX PREFECTURE", TEL. NO. "123-456-789", and a table of supported children (18 years or younger) listing "Minato Fuji" (birthdate 6/26/2010, relationship Child) and "Mirai Fuji" (birthdate 12/12/2013, relationship Child). An overlay window (62) titled "SCANNED IMAGE / RECOGNITION RESULT / CHECKED" displays three item panels rotated:*

- *ITEM NAME: CHILD'S NAME 1 — scanned "Minato Fuji" / recognized "Minato Fuji"*
- *ITEM NAME: CHILD'S RELATIONSHIP 1 — scanned "Child" / recognized "Child"*
- *ITEM NAME: CHILD'S BIRTHDATE 1 — scanned "6/26/2010" / recognized "6/26/2010"*

*Reference labels: 104, 76, 64, 102, 68, 78, 70, 72, 80, 74, 58, 62, 60. Buttons: APPLY, CANCEL. PAGE: 1/1.]*

INFORMATION PROCESSING APPARATUS FOR TEXT RECOGNITION, NON-TRANSITORY COMPUTER READABLE MEDIUM FOR TEXT RECOGNITION PROCESS AND INFORMATION PROCESSING METHOD FOR TEXT RECOGNITION

CROSS-REFERENCE TO RELATED APPLICATIONS

This application is based on and claims priority under 35 USC 119 from Japanese Patent Application No. 2018-173596 filed Sep. 18, 2018.

BACKGROUND

(i) Technical Field

The present disclosure relates to information processing apparatuses and non-transitory computer readable media.

(ii) Related Art

Text recognition processes have been known. A certainty factor with respect to a text recognition result is sometimes calculated. A certainty factor is the degree of certainty at which recognized text is correct. For example, the degree of similarity between recognized text and candidate text and other definitions are used as a certainty factor. Normally, it is conceived that the possibility of an incorrect recognition result decreases with increasing certainty factor.

Japanese Unexamined Patent Application Publication No. 2016-212812 discloses an apparatus that classifies a text recognition target into three types and executes any one of extraction of a text recognition result, manual input of a text recognition target, and manual input of a text recognition target by multiple persons in accordance with the categorized type.

Japanese Unexamined Patent Application Publication No. 2012-64195 discloses an apparatus that displays a text recognition result of a form image with a high priority level on a correction screen.

Even if the certainty factor with respect to a text recognition result is high, it does not necessarily mean that the recognition result shows correct text. For example, regardless of the fact that a high certainty factor is obtained, it is conceivable that a recognition result expressing incorrect text may be obtained due to the dictionary used in the text recognition process, the algorithm for the text recognition process, the arithmetic algorithm for the certainty factor, and so on.

SUMMARY

Aspects of non-limiting embodiments of the present disclosure relate to warning a user about erroneous recognition of a text recognition result even when a high certainty factor is calculated with respect to the recognition result.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including an acquiring unit, a confirming unit, and a controller. The acquiring unit acquires a text recognition result with respect to a first image showing a document and a certainty factor indicating a certainty of the text recognition result. The confirming unit confirms the text recognition result if the certainty factor is above or equal to a threshold value. The controller controls an output of a warning for the text recognition result with respect to the first image in a case where the text recognition result and a text recognition result with respect to a second image showing a relevant document related to the document do not match even when the certainty factor is above or equal to the threshold value.

BRIEF DESCRIPTION OF THE DRAWINGS

Exemplary embodiments of the present disclosure will be described in detail based on the following figures, wherein:

FIG. 5 illustrates a form;

FIG. 7 illustrates a display example of recognition results;

FIG. 10 illustrates a confirmation screen; and

FIG. 11 illustrates a display example of recognition results.

DETAILED DESCRIPTION

Figure 1:
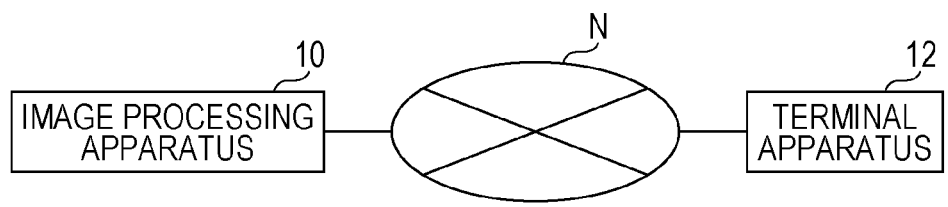
FIG. 1 illustrates an information processing system according to an exemplary embodiment.

An information processing system according to an exemplary embodiment of the present disclosure will now be described with reference to FIG. 1. FIG. 1 illustrates an image processing system as an example of the information processing system according to this exemplary embodiment.

The image processing system includes an image processing apparatus 10 as an example of the information processing apparatus and at least one terminal apparatus 12. For example, the image processing apparatus 10 and the terminal apparatus 12 have a function of communicating with each other via a communication path N, such as the Internet or another network. The image processing system may also include another apparatus, such as a server.

The image processing apparatus 10 applies a recognition process (i.e., a text recognition process and/or a mark recognition process) to image data so as to recognize, for example, text, symbol, and/or mark from the image data. Examples of the recognition process to be executed include an optical character recognition (OCR) process and an optical mark recognition (OMR) process.

The recognition-target image data to be recognized is not particularly limited. For example, an image reading process may be performed on a document by an image reading device (such as a scanner), and image data generated as a result of the image reading process may be used as the recognition-target image data. Alternatively, image data generated as a result of an imaging device (such as a camera) acquiring an image of a document may be used as the recognition-target image data. Needless to say, image data generated by another alternative method may be used as the recognition-target image data.

The terminal apparatus 12 is, for example, a personal computer (PC), a tablet PC, a smartphone, or a portable telephone. For example, information indicating an image-data recognition result is transmitted from the image processing apparatus 10 to the terminal apparatus 12, and the recognition result is displayed on the terminal apparatus 12.

Figure 2:
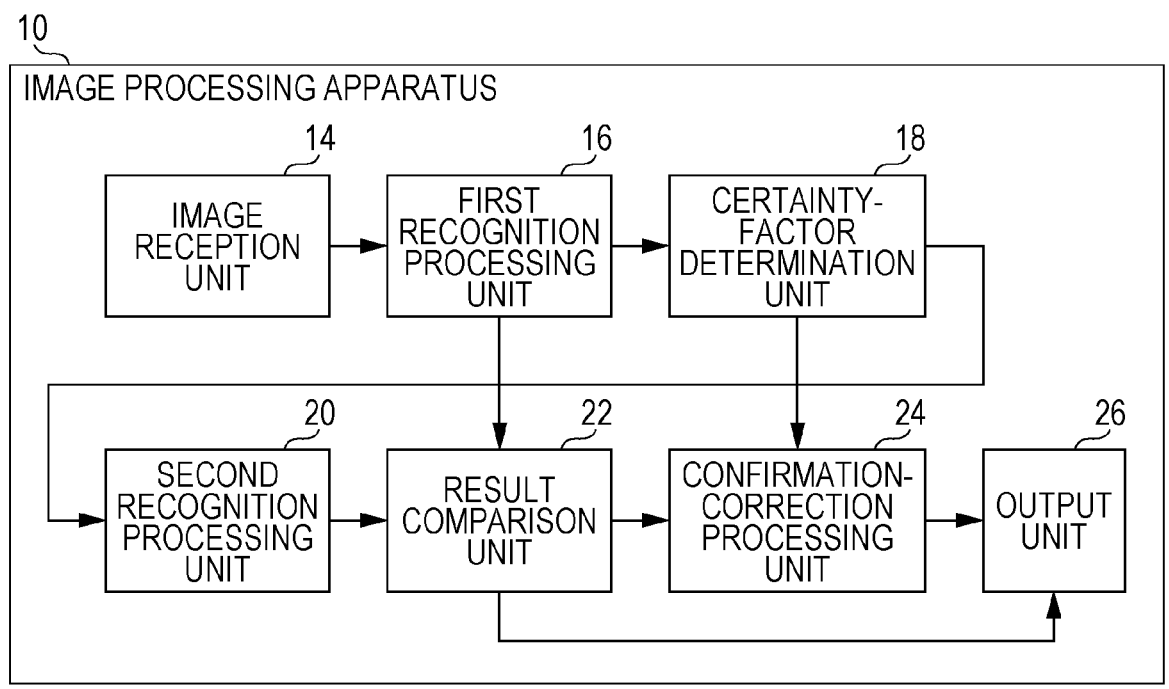
FIG. 2 illustrates an image processing apparatus according to an exemplary embodiment.

The image processing apparatus 10 will be described in detail below with reference to FIG. 2. FIG. 2 illustrates the configuration of the image processing apparatus 10.

An image reception unit 14 receives the recognition-target image data and outputs the image data to a first recognition processing unit 16. The image reception unit 14 may receive image data transmitted from an external apparatus via the communication path N or may receive image data output from the image reading device or the imaging device. The image reading device and/or the imaging device may be included in the image processing apparatus 10. For example, the image reception unit 14 receives image data showing a document (referred to as "document image data" hereinafter) as the recognition-target image data.

The first recognition processing unit 16 applies a recognition process (a text recognition process and/or a mark recognition process) to the recognition-target document image data received by the image reception unit 14, so as to recognize text, symbol, and/or mark from the document image data. For example, the first recognition processing unit 16 identifies each inscription region (e.g., a text inscription field or a checkbox) assumed as being where information (such as text, symbol, or mark) is inscribed in the document image data, and recognizes the information (such as the text, symbol, or mark) inscribed in the inscription region. The first recognition processing unit 16 may recognize a predetermined region (e.g., a region designated by a user, such as an image inputter who has input the document image data to the image processing apparatus 10 or a corrector who checks and corrects the recognition result) as the inscription region or may recognize a region having a predetermined shape and size as the inscription region. For example, text, symbol, or mark is handwritten in the inscription region by the inputter, and the first recognition processing unit 16 recognizes the text, symbol, or mark handwritten in the inscription region.

Furthermore, the first recognition processing unit 16 calculates a certainty factor of the recognition with respect to the document image data. A certainty factor indicates the degree of certainty at which text, symbol, or mark recognized as a result of the recognition process is correct. For example, a reciprocal of the distance between the feature of text extracted from the image undergoing the recognition process and the standard feature of a recognition candidate of the text is used as the certainty factor. A larger certainty factor indicates that the feature of the extracted text and the standard feature of the recognition candidate are close to each other, meaning that a probability in which the recognition result is incorrect is low. As another definition, the degree of similarity between features may be used as the certainty factor. Alternatively, other definitions may be used.

The first recognition processing unit 16 outputs information indicating the certainty factor and information indicating the recognition result with respect to each inscription region in the document image data to a certainty-factor determination unit 18 and a result comparison unit 22.

For each inscription region, the certainty-factor determination unit 18 determines whether or not a comparison process with a relevant document, to be described later, is to be executed based on the certainty factor. If the certainty factor is above or equal to a certainty-factor threshold value, the certainty-factor determination unit 18 determines that the comparison process with the relevant document is necessary with regard to the inscription region where the certainty factor is obtained. If the certainty factor is below the threshold value, the certainty-factor determination unit 18 determines that the comparison process with the relevant document is not necessary with regard to the inscription region where the certainty factor is obtained. The certainty-factor threshold value is a predetermined value and may be changed by the image inputter or the corrector. Furthermore, if the certainty factor with respect to the recognition result is above or equal to the threshold value, the certainty-factor determination unit 18 confirms the recognition result. The certainty-factor determination unit 18 corresponds to an example of a confirming unit.

A second recognition processing unit 20 applies a recognition process (a text recognition process and/or a mark recognition process) to relevant-document image data showing the relevant document so as to recognize, for example, text, symbol, and/or mark from the relevant-document image data. For example, the second recognition processing unit 20 identifies each inscription region (e.g., a text inscription field or a checkbox) assumed as being where information (such as text, symbol, or mark) is inscribed or printed in the relevant-document image data, and recognizes the information (such as the text, symbol, or mark) inscribed or printed in the inscription region. The second recognition processing unit 20 may recognize a predetermined region (e.g., a region designated by an image inputter or a corrector) in the relevant-document image data as the inscription region or may recognize a region having a predetermined shape and size as the inscription region. Furthermore, the second recognition processing unit 20 calculates a certainty factor of the recognition with respect to the relevant-document image data.

A relevant document is related to a recognition-target document that is to be recognized and that shows recognition-target document image data to be recognized, and has inscribed or printed therein, for example, text, symbol, and/or mark that may be compared with text, symbol, and/or mark inscribed in the recognition-target document. For example, a document having inscribed or printed therein information indicating, for example, text inscribed in the recognition-target document is used as the relevant document. Text inscribed in the relevant document may be handwritten text or may be printed text. The term "printed text" includes, for example, non-handwritten text and typed text.

In detail, in a case where a document assumed to have a full name inscribed therein is the recognition-target document, another document having that full name inscribed or printed therein is used as the relevant document. For example, in a case where a document assumed to have the full name of an inscriber inscribed therein is the recognition-target document, another document having the full name of that inscriber inscribed or printed therein is used as the relevant document. In detail, a document (such as a driver's license, an insurance certificate, or another official document) having inscribed or printed therein information (such as the full name) for identifying the inscriber is used as the relevant document. Such a document may also be regarded as a document related to the inscriber.

In a case where a document assumed to have inscribed therein the full name of a person other than the inscriber is the recognition-target document, another document having inscribed or printed therein the full name of that person other than the inscriber is used as the relevant document. For example, a document (such as a driver's license, an insurance certificate, or another official document) having inscribed or printed therein information (such as the full name) for identifying the person other than the inscriber is used as the relevant document. The same applies to, for example, the address and the birthdate.

In a case where a document assumed to have other information (such as a disease name or a number) inscribed therein is the recognition-target document, another document having that other information (such as the disease name or the number) inscribed or printed therein is used as the relevant document. For example, in a case where the recognition-target document is a medical chart, another document having inscribed or printed therein, for example, a disease name inscribed in the medical chart is used as the relevant document. In a case where the recognition-target document is a document having inscribed therein information for identifying an individual, such as an individual number, another document having that information inscribed or printed therein is used as the relevant document.

The relevant documents described above are merely examples, and other documents having inscribed or printed therein information indicating, for example, text inscribed in the recognition-target document may be used as the relevant document.

Similar to the recognition-target document, the relevant document may be read by the image reading device or may be imaged by the imaging device. Accordingly, relevant-document image data showing the relevant document is generated. The relevant-document image data is received by the image reception unit 14 and is output from the image reception unit 14 to the second recognition processing unit 20.

The second recognition processing unit 20 outputs information indicating a recognition result with respect to each inscription region in the relevant-document image data and information indicating a certainty factor to the result comparison unit 22.

The result comparison unit 22 compares the output result of the first recognition processing unit 16 with the output result of the second recognition processing unit 20. If the two output results do not match, the result comparison unit 22 outputs information indicating the comparison result to a confirmation-correction processing unit 24. If the two output results match, the result comparison unit 22 outputs information indicating the recognition result to an output unit 26. For example, if the two output results do not match, a warning for the recognition result obtained by the first recognition processing unit 16 is displayed. If the two output results match, such a warning is not displayed.

More specifically, the result comparison unit 22 compares a recognition result with respect to an inscription region (simply referred to as "first inscription region" hereinafter) in the recognition-target document with a recognition result with respect to an inscription region (simply referred to as "second inscription region" hereinafter) corresponding to the first inscription region in the relevant document. The second inscription region is where a recognition result to be compared with the recognition result with respect to the first inscription region is obtained. For example, if the first inscription region has a full name inscribed therein, the second inscription region has that full name inscribed or printed therein. The first inscription region and the second inscription region are set in advance and are preliminarily associated with each other. For example, the user (such as an image inputter or a corrector) sets the first inscription region and the second inscription region, and associates the first inscription region and the second inscription region with each other. A second inscription region is set for each first inscription region.

For example, in a case where the certainty factor of the recognition result with respect to the first inscription region is above or equal to the certainty-factor threshold value, the result comparison unit 22 compares the recognition result with respect to the first inscription region with the recognition result with respect to the second inscription region. The result comparison unit 22 functions as an example of an acquiring unit.

Furthermore, multiple relevant documents may be set for a single recognition-target document. In this case, the result comparison unit 22 compares the recognition result with respect to the single document with the recognition result with respect to each relevant document.

Moreover, multiple second inscription regions may be associated with the first inscription region. Each second inscription region may be an inscription region within the same relevant document (such as a relevant document A) or may be an inscription region within different relevant documents (such as relevant documents A and B). In this case, the result comparison unit 22 compares the recognition result with respect to the first inscription region with the multiple second inscription regions. For example, in a case where the number or the percentage of second inscription regions of which the recognition results match the recognition result with respect to the first inscription region is below a predetermined threshold value, a warning for the recognition result with respect to the first inscription region is displayed. If the number or percentage is above or equal to the threshold value, the warning is not displayed. The threshold value may be changed by, for example, the image inputter or the corrector. In a case where the recognition result with respect to the first inscription region matches the recognition results with respect to all of the second inscription regions, the warning is not displayed. In a case where the recognition result with respect to the first inscription region does not match the recognition result with respect to at least one of the second inscription regions, the warning may be displayed.

Furthermore, priority levels may be set for the second inscription regions. For example, the priority level of a second inscription region having text printed therein instead of handwritten therein may be set to be higher than the priority level of a second inscription region having text handwritten therein. In a case where the recognition result with respect to the first inscription region matches the recognition result with respect to a second inscription region with a priority level higher than or equal to a threshold value, a warning is not displayed. Otherwise, the warning may be displayed.

Moreover, second inscription regions in different relevant documents may be associated with different first inscription regions. Specifically, a second inscription region in a relevant document A may be associated with a certain first inscription region, and a second inscription region in another relevant document B may be associated with another first inscription region.

The confirmation-correction processing unit 24 corrects a recognition result obtained by the first recognition processing unit 16. For example, when the confirmation-correction processing unit 24 receives a correction command from the corrector, the confirmation-correction processing unit 24 corrects the recognition result in accordance with the correction command. The correction command is given by using, for example, the terminal apparatus 12.

The output unit 26 outputs recognition-target document image data and also outputs information indicating a recognition result. For example, the output unit 26 outputs information indicating a corrected recognition result, as well as information indicating a recognition result confirmed without being corrected. For example, these pieces of information may be output from the image processing apparatus 10 to the terminal apparatus 12 so as to be displayed in the terminal apparatus 12, or may be output to the terminal apparatus 12 or a server so as to be stored in the terminal apparatus 12 or the server.

Furthermore, even when the certainty factor of the recognition result with respect to the first inscription region is above or equal to the threshold value, if the recognition result with respect to the first inscription region and the recognition result with respect to the second inscription region do not match, the output unit 26 outputs information (warning information) indicating a warning for the first inscription region. For example, the warning information is transmitted from the image processing apparatus 10 to the terminal apparatus 12 and is displayed on a user interface (UI) 30 of the terminal apparatus 12. The output unit 26 functions as an example of a controller.

Figure 3:
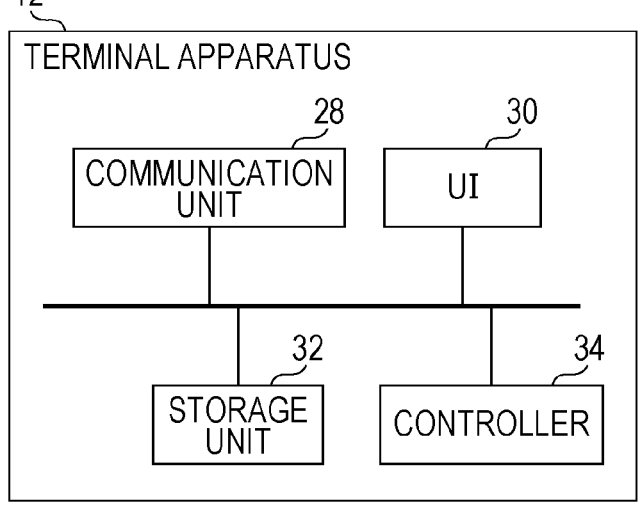
FIG. 3 illustrates a terminal apparatus.

The terminal apparatus 12 will be described in detail below with reference to FIG. 3. FIG. 3 illustrates the configuration of the terminal apparatus 12.

A communication unit 28 is a communication interface having a function for transmitting information to another apparatus, as well as a function for receiving information transmitted from another apparatus. The communication unit 28 may have a wireless communication function or may have a wired communication function.

The UI 30 is a user interface including a display unit and an operable unit. The display unit is a display device, such as a liquid crystal display or an electroluminescence (EL) display. The operable unit is an input device, such as a keyboard. Alternatively, a user interface serving as both a display unit and an operable unit (such as a touchscreen) may be used as the UI 30. Moreover, the UI 30 may include a sound generator that generates sound, such as a speaker, and a sound input unit that receives an input of sound, such as a microphone.

For example, recognition-target document image data and information indicating a recognition result are displayed on the display unit of the UI 30. The user, such as the corrector, may operate the UI 30 to give a correction command for the recognition result.

A storage unit 32 includes one or more storage regions storing various types of information (such as data and/or programs), and is constituted of one or more storage devices (such as hard disk drives and/or memory devices).

A controller 34 controls the operation of each unit of the terminal apparatus 12. For example, the controller 34 controls the communication performed by the communication unit 28, controls the display of various types of information on the UI 30 (i.e., the display unit), and controls the reception of information input via the UI 30 (i.e., the operable unit). In detail, the controller 34 causes the display unit of the UI 30 to display information indicating the recognition-target document image data and the recognition result.

Although the image processing apparatus 10 and the terminal apparatus 12 are configured as separate hardware units in the example shown in FIG. 1, the terminal apparatus 12 may be incorporated into the image processing apparatus 10. Specifically, the image processing apparatus 10 may have the components (such as the UI 30) included in the terminal apparatus 12. In this case, information indicating recognition-target document image data and a recognition result may be displayed on a display unit provided in the image processing apparatus 10. Moreover, the corrector may operate a UI provided in the image processing apparatus 10 so as to correct the recognition result.

Figure 4:
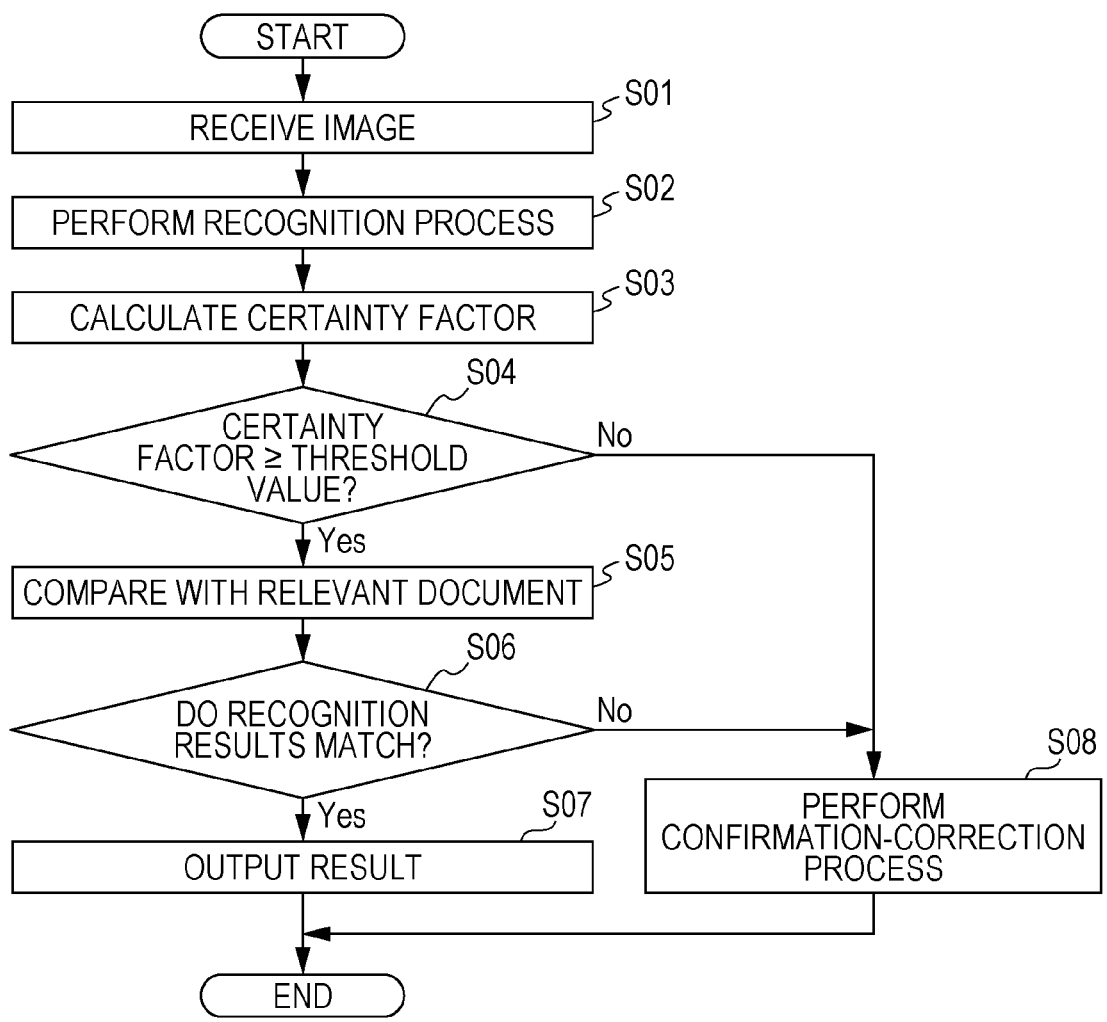
FIG. 4 illustrates a flowchart related to operation of the image processing apparatus.

The operation of the image processing apparatus 10 will be described below with reference to FIG. 4. FIG. 4 illustrates a flowchart related to the operation.

First, recognition-target document image data and relevant-document image data are input to the image processing apparatus 10, and the image reception unit 14 receives the document image data and the relevant-document image data in step S01. The relevant-document image data may be input to the image processing apparatus 10 in advance. Moreover, a first inscription region and a second inscription region are set in advance.

Subsequently, in step S02, the first recognition processing unit 16 identifies an inscription region (i.e., the first inscription region) in the recognition-target document image data, and recognizes text, symbol, and/or mark inscribed within the inscription region. For example, the first inscription region is designated in advance by an image inputter or a corrector.

In step S03, the first recognition processing unit 16 calculates a certainty factor with respect to each recognition result.

If the certainty factor is above or equal to the threshold value (Yes in step S04), a comparison process with a relevant document is executed in step S05. For example, a recognition result with a certainty factor above or equal to the threshold value is compared with the relevant document.

In this case, the second recognition processing unit 20 identifies a second inscription region associated with the first inscription region where the recognition result with the certainty factor above or equal to the threshold value is obtained in the relevant-document image data, and recognizes text, symbol, and/or mark inscribed or printed in the second inscription region. The result comparison unit 22 compares the recognition result with respect to the first inscription region with the recognition result with respect to the second inscription region. For example, the second inscription region is designated in advance by the image inputter or the corrector, and is associated in advance with the first inscription region.

If the recognition result with respect to the first inscription region and the recognition result with respect to the second inscription region match (Yes in step S06), a confirmation-correction process is not performed on the recognition result with respect to the first inscription region, and the output unit 26 outputs information indicating the recognition result with respect to the first inscription region in step S07.

If the recognition result with respect to the first inscription region and the recognition result with respect to the second inscription region do not match (No in step S06), the confirmation-correction process is performed in step S08. For example, the output unit 26 transmits, to the terminal apparatus 12, information indicating the recognition result with respect to the first inscription region and information indicating the recognition result with respect to the second inscription region. The controller 34 of the terminal apparatus 12 causes the UI 30 to display these pieces of information. Moreover, the output unit 26 transmits, to the terminal apparatus 12, information (i.e., warning information) indicating that the two recognition results do not match. The controller 34 of the terminal apparatus 12 causes the UI 30 to display this warning information. Then, if the corrector operates the terminal apparatus 12 to give a correction command, the confirmation-correction processing unit 24 corrects the recognition result with respect to the first inscription region in accordance with the correction command.

If the certainty factor is below the threshold value (No in step S04), the confirmation-correction process is performed in step S08 instead of the comparison process with the relevant document.

The process from step S03 to step S08 is performed for every recognition result with respect to each first inscription region.

The operation of the image processing apparatus 10 will be described below in further detail with reference to a specific example. In the following description, "image data" will be referred to as "image", "document image data" will be referred to as "document image", and "relevant-document image data" will be referred to as "relevant-document image".

A recognition-target document image to be recognized will be described with reference to FIG. 5. For example, a document image showing a form is used as a recognition-target image to be recognized. FIG. 5 illustrates an example of the form. A form 36 is a document used for a certain procedure.

The form 36 has (e.g., printed) thereon inscription fields where information (such as text characters, symbols, and marks) is handwritten by an inscriber. For example, the form 36 preliminarily has a name inscription field 38 where the full name of a child 1 is inscribed, a relationship inscription field 40 where the relationship with the child 1 is inscribed, and a birthdate inscription field 42 where the birthdate of the child 1 is inscribed. With regard to a child 2, the form 36 preliminarily has a name inscription field 44, a relationship inscription field 46, and a birthdate inscription field 48. Each of these inscription fields corresponds to a first inscription region.

In the example shown in FIG. 5, for each of the child 1 and the child 2, a text string indicating the full name of the child, a text string indicating the relationship, and a text string indicating the birthdate are inscribed in the name inscription field, the relationship inscription field, and the birthdate inscription field, respectively.

For example, the form 36 is read by the image reading device (such as a scanner), so that a document image showing the form 36 (referred to as "form image" hereinafter) is generated. Alternatively, the form image may be generated by the imaging device (such as a camera) acquiring an image of the form 36.

The form image is input to the image processing apparatus 10, is received by the image reception unit 14, and subsequently undergoes a recognition process.

For example, the first recognition processing unit 16 applies a text recognition process to each inscription field (first inscription region) shown in the form image so as to recognize text inscribed in each inscription field, and also applies a mark recognition process to each checkbox (first inscription region) so as to recognize a mark (check mark) inscribed in each checkbox. For example, the name inscription fields 38 and 44, the relationship inscription fields 40 and 46, the birthdate inscription fields 42 and 48, and the checkboxes are designated by an image inputter or a corrector as recognition-target first inscription regions to be recognized, and the first recognition processing unit 16 executes a recognition process on these designated inscription fields and checkboxes.

Alternatively, the first recognition processing unit 16 may recognize text characters and marks by using a known recognition technique instead of the recognition technique described above. For example, the first recognition processing unit 16 may recognize a rectangular region (such as a rectangular or square region surrounded by a linear frame) in the form image as an inscription field or checkbox and may recognize text or mark inscribed in that inscription field or checkbox. The name inscription field 38 has a rectangular region, and the first recognition processing unit 16 recognizes text inscribed in the name inscription field 38. The same applies to the remaining inscription fields. Alternatively, the first recognition processing unit 16 may recognize a region having a shape other than the rectangular shape (such as a circular or elliptical region or a region surrounded by parenthesis) as an inscription field and may recognize text or mark inscribed in that region. Moreover, the positions (coordinates) of the inscription fields and checkboxes in the form image may be set in advance. In this case, the first recognition processing unit 16 identifies the position of each inscription field or checkbox in the form image based on the coordinates of the inscription field or checkbox, and recognizes text or mark inscribed in the inscription field or checkbox.

Figure 6:
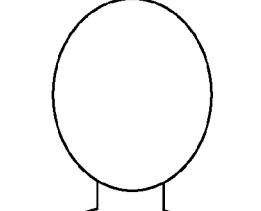
FIG. 6 illustrates a relevant document.

A relevant document will be described below with reference to FIG. 6. FIG. 6 illustrates an example of a relevant document 50. The relevant document 50 is related to a person "Minato Fuji" whose full name is inscribed in the name inscription field 38 of the form 36. For example, the relevant document 50 has (e.g., printed) therein a name inscription field 52, a birthdate inscription field 54, and an address inscription field 56. The name inscription field 52 has the full name of the person printed therein, the birthdate inscription field 54 has the birthdate of the person printed therein, and the address inscription field 56 has the address of the person printed therein. In the relevant document 50, the full name, birthdate, and address are printed therein instead of being handwritten therein. The relevant document 50 is, for example, an identification document for the person (e.g., a driver's license, an insurance certificate, a member certificate, an employee certificate, a resident certificate, or another official document).

Because the relevant document 50 has printed therein the full name corresponding to the full name inscribed in the name inscription field 38 in the form 36, the relevant document 50 is used for comparing with a recognition result with respect to the name inscription field 38. Likewise, because the relevant document 50 has printed therein the birthdate corresponding to the birthdate inscribed in the birthdate inscription field 42 in the form 36, the relevant document 50 is used for comparing with a recognition result with respect to the birthdate inscription field 42.

For example, the name inscription field 38 in the form 36 is set in advance as a first inscription region, and the name inscription field 52 in the relevant document 50 is set in advance as a second inscription region with respect to the name inscription field 38. The name inscription field 38 and the name inscription field 52 are associated with each other in advance.

Likewise, the birthdate inscription field 42 in the form 36 is set in advance as a first inscription region, and the birthdate inscription field 54 in the relevant document 50 is set in advance as a second inscription region. The birthdate inscription field 42 and the birthdate inscription field 54 are associated with each other in advance.

For example, a first inscription region and a second inscription region are set in advance by the image inputter or the corrector, and the first inscription region and the second inscription region are associated with each other in advance. Information indicating the association between the inscription regions is, for example, linked with a recognition-target document image and a relevant-document image. This linking process may be performed by, for example, the image reception unit 14 or the terminal apparatus 12. For example, the recognition-target document image and the relevant-document image are displayed on the UI 30 of the terminal apparatus 12. The image inputter or the corrector operates the terminal apparatus 12 so as to designate the first inscription region in the recognition-target document image and the second inscription region in the relevant-document image, and associate the first inscription region and the second inscription region with each other. The information indicating the association between the two is linked with the recognition-target document image and the relevant-document image.

For example, the second recognition processing unit 20 applies a text recognition process to each inscription field (second inscription region) shown in the relevant-document image so as to recognize text printed in the inscription field, and applies a mark recognition process to each checkbox (second inscription region) so as to recognize a mark (check mark) printed in the checkbox. For example, the name inscription field 52, the birthdate inscription field 54, and the address inscription field 56 are designated by the image inputter or the corrector as recognition-target second inscription regions, and the second recognition processing unit 20 executes a recognition process on these designated inscription fields.

If the certainty factor of the recognition result with respect to the first inscription region recognized by the first recognition processing unit 16 is above or equal to the threshold value, the result comparison unit 22 compares the recognition result with respect to the first inscription region with the recognition result with respect to the second inscription region recognized by the second recognition processing unit 20, and determines whether or not the two recognition results match. For example, in a case where the name inscription field 38 (i.e., the name inscription field in the form 36) as a first inscription region and the name inscription field 52 (i.e., the name inscription field in the relevant document 50) as a second inscription region are associated with each other, if the certainty factor of the recognition result with respect to the name inscription field 38 is above or equal to the threshold value, the result comparison unit 22 compares the recognition result with respect to the name inscription field 38 with the recognition result with respect to the name inscription field 52. Furthermore, in a case where the birthdate inscription field 42 in the form 36 and the birthdate inscription field 54 in the relevant document 50 are associated with each other, if the certainty factor of the recognition result with respect to the birthdate inscription field 42 is above or equal to the threshold value, the result comparison unit 22 compares the recognition result with respect to the birthdate inscription field 42 with the recognition result with respect to the birthdate inscription field 54. The same applies to the remaining inscription fields.

Multiple second inscription regions may be associated with a single first inscription region, and the recognition result with respect to the first inscription region may be compared with the recognition result with respect to each of the multiple second inscription regions. For example, the name inscription field 38 as a first inscription region may be associated with the name inscription field 52 as a second inscription region in the relevant document 50 and with a name inscription field (referred to as "name inscription field B" hereinafter) as a second inscription region in another relevant document (such as the relevant document B). In this case, the result comparison unit 22 compares the recognition result with respect to the name inscription field 38 with the recognition result with respect to the name inscription field 52, and also compares the recognition result with respect to the name inscription field 38 with the recognition result with respect to the name inscription field B. The same applies to the remaining inscription fields.

Moreover, second inscription regions in different relevant documents may be associated with different first inscription regions. For example, the name inscription field 52 as a second inscription region in the relevant document 50 may be associated with the name inscription field 38 as a first inscription region, and a relationship inscription field (referred to as "relationship inscription field B" hereinafter) as a second inscription region in another relevant document (such as the relevant document B) may be associated with the relationship inscription field 40 as a first inscription region. In this case, the result comparison unit 22 compares the recognition result with respect to the name inscription field 38 with the name inscription field 52 in the relevant document 50, and also compares the recognition result with respect to the relationship inscription field 40 with the relationship inscription field B in the relevant document B.

Figure 7:
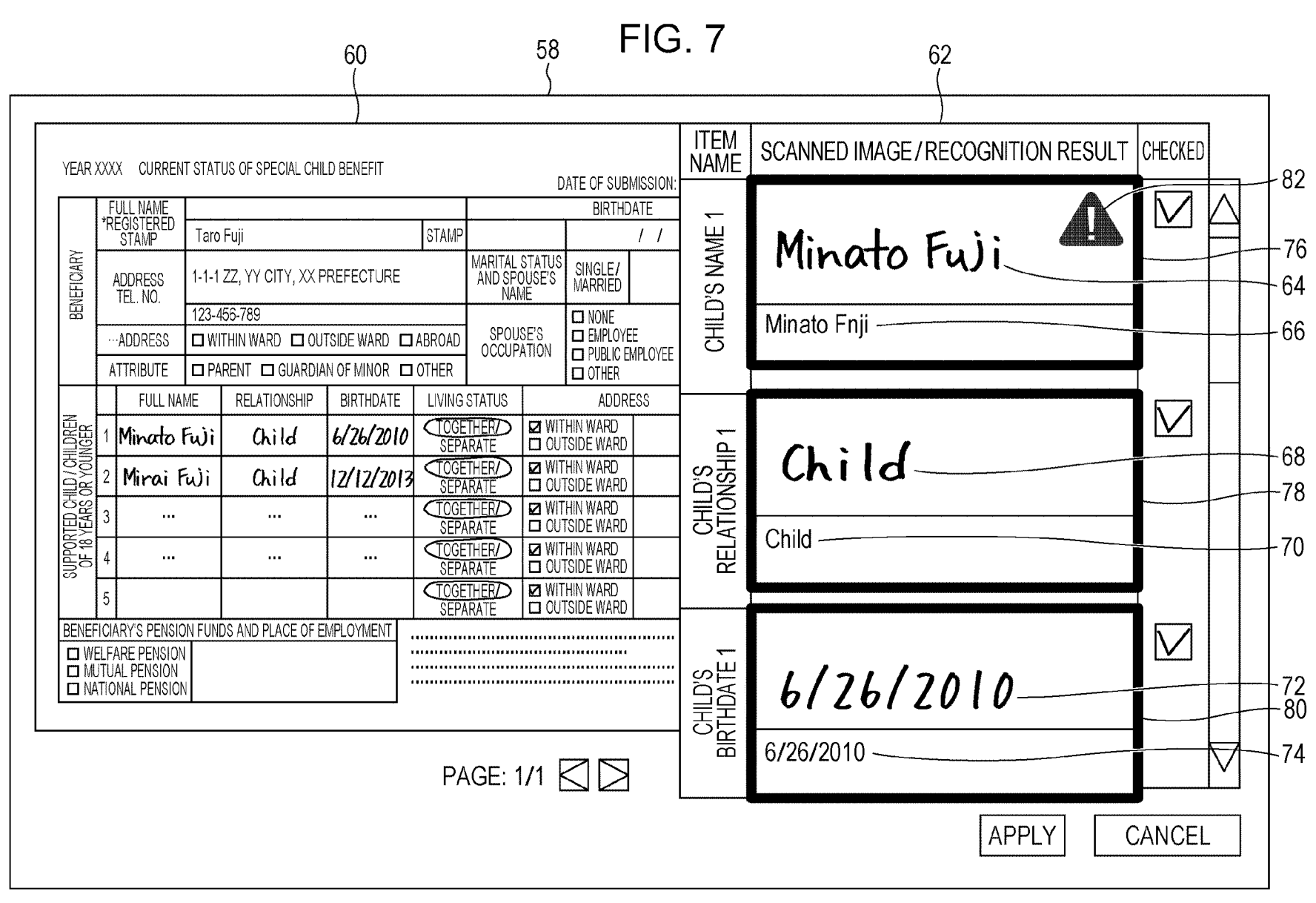

When the recognition process is performed in this manner, the recognition results are displayed in the terminal apparatus 12. A display example of recognition results will be described below with reference to FIG. 7. FIG. 7 illustrates an example of a screen that displays the recognition results.

A screen 58 displays the recognition results. For example, the output unit 26 generates information about the screen 58 based on the form image, the recognition results with respect to the form image, and a comparison result between the recognition result with respect to each first inscription region and the recognition result with respect to the corresponding second inscription region. The information about the screen 58 is transmitted from the image processing apparatus 10 to the terminal apparatus 12. The controller 34 of the terminal apparatus 12 causes the UI 30 to display the screen 58.

In the example shown in FIG. 7, the screen 58 displays a form image 60 showing the form 36 and a display field 62 for the recognition results. The display field 62 displays a recognized image in the form image 60 (such as a scanned image generated by scanning), and also displays information indicating the result of the recognition process performed on that image. Specifically, an image showing a first inscription region and a recognition result with respect to that first inscription region are displayed in the display field 62. Moreover, information indicating a comparison result between a recognition result with respect to a first inscription region and a recognition result with respect to a second inscription region are also displayed in the display field 62.

An image 64 shows the name inscription field 38 (i.e., an example of a first inscription region) and shows a text string handwritten in the name inscription field 38. A recognition result 66 is obtained as a result of applying a text recognition process to the name inscription field 38. A text string (such as the text string "Minato Fuji") is displayed as the recognition result 66.

An image 68 shows the relationship inscription field 40 (i.e., an example of a first inscription region) and shows a text string handwritten in the relationship inscription field 40. A recognition result 70 is obtained as a result of applying a text recognition process to the relationship inscription field 40. A text string (such as the text string "Child") is displayed as the recognition result 70.

An image 72 shows the birthdate inscription field 42 (i.e., an example of a first inscription region) and shows a text string handwritten in the birthdate inscription field 42. A recognition result 74 is obtained as a result of applying a text recognition process to the birthdate inscription field 42. A text string (such as the text string "6/26/2010") is displayed as the recognition result 74.

An image and a recognition result are similarly displayed for each of the remaining inscription fields and checkboxes.

Furthermore, information indicating a certainty factor is displayed for each item (inscription field or checkbox). For example, information indicating a certainty factor is expressed as a frame color of each item. An item frame 76 is a frame of a region in which a recognition result of a child's full name 1 is displayed. In the item frame 76, the image 64 and the recognition result 66 are displayed. An item frame 78 is a frame of a region in which a recognition result of a child's relationship 1 is displayed. In the item frame 78, the image 68 and the recognition result 70 are displayed. An item frame 80 is a frame of a region in which a recognition result of a child's birthdate 1 is displayed. In the item frame 80, the image 72 and the recognition result 74 are displayed.

Different colors are set in advance for different levels of certainty factors. Each item frame is expressed using the color according to the certainty factor of the recognition result with respect to the item frame. For example, if the certainty factor is 80% or higher, the color of the item frame is green. If the certainty factor is 50% or higher and below 80%, the color of the item frame is yellow. If the certainty factor is below 50%, the color of the item frame is red. These numerical values and the ranges of the certainty factors are merely examples.

For example, the certainty factor of the recognition result with respect to each of the name inscription field 38, the relationship inscription field 40, and the birthdate inscription field 42 is 80% or higher, so that the item frames 76, 78, and 80 are expressed in green.

The certainty factor may be displayed as a numerical value instead of being expressed using color or in addition to being expressed using color.

In a case where the certainty factor of a recognition result with respect to a first inscription region is above or equal to the threshold value, if the recognition result with respect to the first inscription region does not match a recognition result with respect to the corresponding second inscription region, information (warning information) indicating that the two recognition results do not match is linked with an image showing the first inscription region and with the recognition result, and is displayed in the display field 62.

In the example shown in FIG. 7, the recognition result with respect to the name inscription field 38 in the form 36 does not match the recognition result with respect to the second inscription region in the relevant document (such as the recognition result with respect to the name inscription field 52 in the relevant document 50), and warning information indicating that the two recognition results do not match is displayed as a warning mark 82 in the item frame 76. For example, the text string "Minato Fnji" is recognized from the name inscription field 38, and the certainty factor of the recognition result is above or equal to the threshold value. In contrast, the text string "Minato Fuji" is recognized from the name inscription field 52. In other words, the text character "n" is recognized from the name inscription field 38, whereas the text character "u" is recognized from the name inscription field 52, resulting in a mismatch between the two recognition results. In this case, the warning mark 82 is displayed. In other words, even in a case where the certainty factor is above or equal to the threshold value, the warning mark 82 is displayed.

Accordingly, even in a case where the certainty factor of a recognition result with respect to a first inscription region is above or equal to the threshold value, if the recognition result with respect to the first inscription region does not match a recognition result with respect to a second inscription region corresponding to the first inscription region, a warning mark is displayed for that first inscription region. Accordingly, even when a high certainty factor is calculated with respect to a text recognition result (i.e., a certainty factor above or equal to the threshold value), the user (such as the corrector) is warned about the erroneous recognition of the recognition result. Even when the certainty factor of a recognition result is high, it does not necessarily mean that the recognition result indicates correct text. For example, a recognition result that has a high certainty factor but does not indicate correct text may sometimes be obtained due to an inscriber's habit. Even in such a case, the user is warned about the erroneous recognition of the recognition result. In a case where text in the second inscription region is printed instead of being handwritten, the recognition accuracy with respect to the second inscription region is higher than the recognition accuracy with respect to handwritten text, so that the accuracy of the warning with respect to erroneous recognition is higher.

In a case where multiple second inscription regions are associated with the name inscription field 38, if the number or percentage of second inscription regions of which the recognition results match the recognition result with respect to the name inscription field 38 is below a predetermined threshold value, the warning mark 82 is displayed. If the number or percentage is above or equal to the threshold value, the warning mark 82 may be not displayed. In a case where the recognition result with respect to the name inscription field 38 matches the recognition results with respect to all of the second inscription regions, the warning mark 82 is not displayed. In a case where the recognition result with respect to the name inscription field 38 does not match the recognition result with respect to at least one of the second inscription regions, the warning mark 82 may be displayed.

This will be described with reference to a specific example. For example, in a case where the name inscription field 52 in the relevant document 50 and the name inscription field B in another relevant document B are associated with the name inscription field 38, if the recognition result with respect to the name inscription field 38 and the recognition results with respect to the name inscription fields 52 and B match, the warning mark 82 is not displayed. If the recognition result with respect to the name inscription field 38 and either one of or both of the recognition results with respect to the name inscription fields 52 and B do not match, the warning mark 82 is displayed.

Alternatively, multiple second inscription regions within the same relevant document may be associated with the name inscription field 38. In this case, similar to the above process, the recognition result with respect to the name inscription field 38 is compared with the recognition result with respect to each second inscription region, and the warning mark is displayed in accordance with the comparison result.

Accordingly, the comparison process is performed by associating multiple second inscription regions with a first inscription region, so that the determination accuracy of erroneous recognition of the recognition result with respect to the first inscription region may be increased, as compared with a case where the comparison process is performed by associating only a single second inscription region with a first inscription region.

In a case where multiple relevant documents are used, the relevant documents may be of different types. For example, a certain relevant document may be a member certificate issued by a private organization, and another relevant document may be a certificate issued by a public organization.

The relationship inscription field 40 as a first inscription region in the form 36 is associated with, for example, a second inscription region (such as a relationship inscription field) in another relevant document (such as a relevant document C). Because a recognition result with respect to the relationship inscription field 40 and a recognition result with respect to the second inscription region match, a warning mark is not displayed for the recognition result with respect to the relationship inscription field 40.

Furthermore, the birthdate inscription field 42 as a first inscription region in the form 36 is associated with the birthdate inscription field 54 in the relevant document 50, and recognition results with respect to these inscription fields match. Thus, a warning mark is not displayed for the recognition result with respect to the birthdate inscription field 42.

The corrector may operate the UI 30 of the terminal apparatus 12 to correct recognition results on the screen 58. For example, the corrector may correct a text string as a recognition result or may correct the presence or absence of a check mark. When a correction command is given by the corrector, information indicating the correction command is transmitted from the terminal apparatus 12 to the image processing apparatus 10, and the confirmation-correction processing unit 24 corrects a recognition result in accordance with the correction command.

In a case where the corrector designates a warning mark on the screen 58 (such as when the corrector clicks on a warning mark), the output unit 26 causes the UI 30 of the terminal apparatus 12 to display, as relevant-document information, information indicating the recognition result with respect to the second inscription region in the relevant document associated with the first inscription region linked with the warning mark. In a case where multiple second inscription regions are associated with a first inscription region, information indicating the recognition result with respect to each inscription region is displayed.

For example, in a case where the warning mark 82 is designated by the user, information indicating the recognition result with respect to the second inscription region associated with the name inscription field 38 as a first inscription region is displayed on the UI 30.

Figure 8:
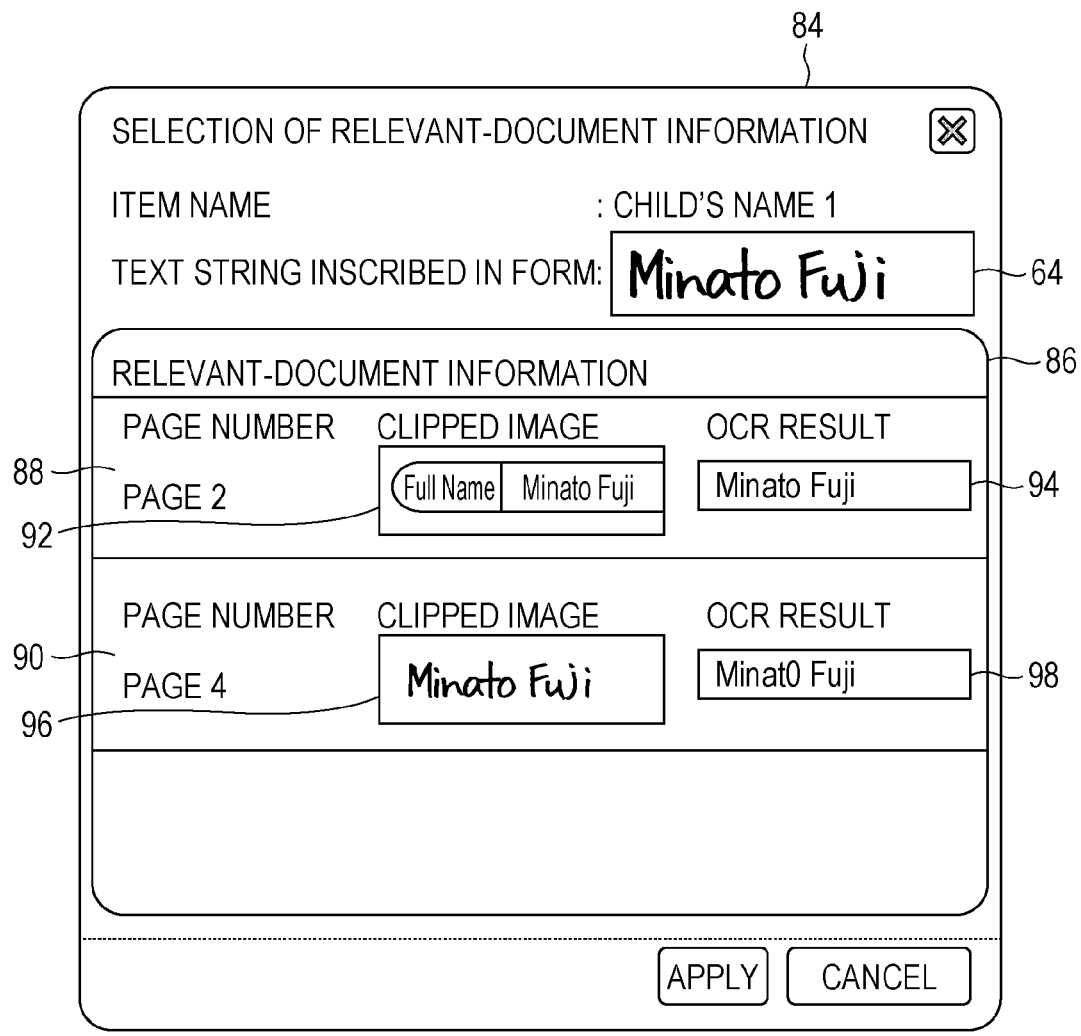
FIG. 8 illustrates a display example of relevant-document information.

A display example of a recognition result with respect to a second inscription region will be described below with reference to FIG. 8. FIG. 8 illustrates the display example. In a case where the warning mark 82 is designated by the user, a display window 84 is displayed on the UI 30. Information about the display window 84 is transmitted from the image processing apparatus 10 to the terminal apparatus 12, so that the display window 84 is displayed on the UI 30 of the terminal apparatus 12. The display window 84 may be displayed in a pop-up fashion in a state where the screen 58 is displayed on the UI 30.

For example, the image 64 showing the name inscription field 38 as a first inscription region and relevant-document information 86 are displayed in the display window 84. Images showing second inscription regions associated with the name inscription field 38 and recognition results with respect to the second inscription regions are displayed as the relevant-document information 86. In the example shown in FIG. 8, multiple second inscription regions are associated with the name inscription field 38, and the images showing the respective second inscription regions and the recognition results are displayed. In detail, second-inscription-region information 88 and second-inscription-region information 90 are displayed as information contained in the relevant-document information 86. The second-inscription-region information 88 contains an image 92 showing a name inscription field (simply referred to as "name inscription field A" hereinafter) as a second inscription region associated with the name inscription field 38, and also contains a recognition result 94 with respect to the name inscription field A. The second-inscription-region information 90 contains an image 96 showing a name inscription field (simply referred to as "name inscription field B" hereinafter) as a second inscription region associated with the name inscription field 38, and also contains a recognition result 98 with respect to the name inscription field B. The name inscription fields A and B may be second inscription regions in the same relevant document or may be second inscription regions in different relevant documents. The images 92 and 96 are images clipped from an image generated as a result of an image reading device reading the relevant document or are images clipped from an image generated as a result of an imaging device imaging the relevant document.

The recognition result 94 with respect to the name inscription field A indicates the text string "Minato Fuji", whereas the recognition result 98 with respect to the relevant document B indicates the text string "Minat0 Fuji". The recognition result (i.e., text string "Minato Fnji") with respect to the name inscription field 38 does not match the recognition results 94 and 98. Thus, the warning mark 82 is displayed for the recognition result with respect to the name inscription field 38.

In the example shown in FIG. 8, since multiple second inscription regions are associated with a first inscription region, a list of multiple pieces of information about the second inscription regions is displayed. If a single second inscription region is associated with a first inscription region, information related to that second inscription region is displayed.

Figure 9:
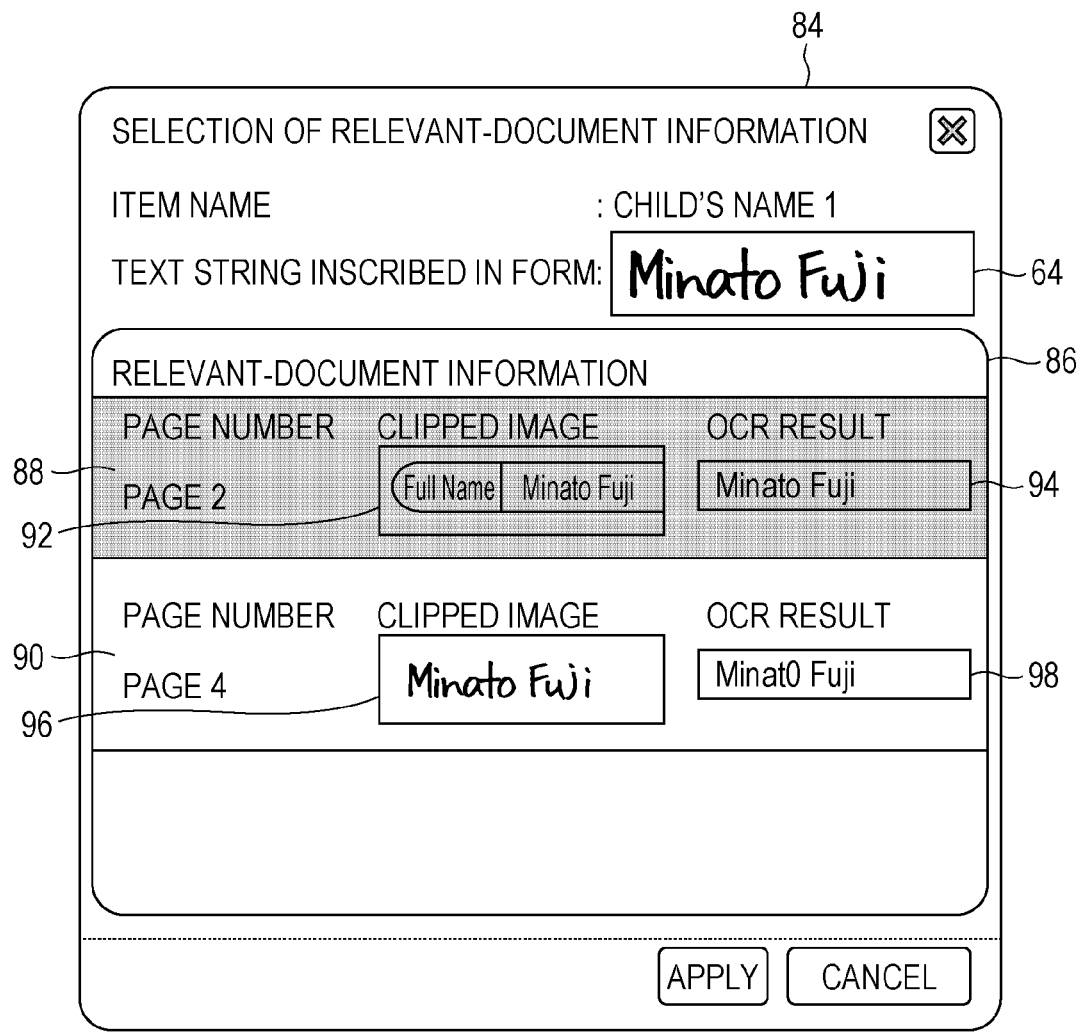
FIG. 9 illustrates a display example of the relevant-document information.

The corrector may use the relevant-document information 86 to correct the recognition result with respect to the name inscription field 38 as a first inscription region. In detail, in a case where the corrector selects second-inscription-region information from the second-inscription-region information 88 and the second-inscription-region information 90 on the display window 84, the confirmation-correction processing unit 24 corrects the recognition result with respect to the name inscription field 38 to a recognition result contained in the selected second-inscription-region information. For example, as shown in FIG. 9, in a case where the corrector selects the second-inscription-region information 88 and gives a correction command (e.g., clicks on an "APPLY" button), information indicating the correction is transmitted from the terminal apparatus 12 to the image processing apparatus 10, and the confirmation-correction processing unit 24 corrects the recognition result with respect to the name inscription field 38 to the recognition result 94 contained in the second-inscription-region information 88. Because the recognition result 94 indicates the text string "Minato Fuji", the recognition result (i.e., text string "Minato Fnji") with respect to the name inscription field 38 is corrected to the text string "Minato Fuji". In other words, the text character "n" is corrected to the text character "u".

The result comparison unit 22 may set the second inscription region (i.e., the name inscription field A) indicated in the second-inscription-region information 88 selected by the corrector as a subsequent second inscription region to be compared with the name inscription field 38. FIG. 10 illustrates an example of a setting screen 100. As mentioned above, in a case where the user selects the second-inscription-region information 88 and gives a correction command (i.e., clicks on the "APPLY" button), the output unit 26 transmits information about the setting screen 100 to the terminal apparatus 12, and the controller 34 of the terminal apparatus 12 causes the UI 30 of the terminal apparatus 12 to display the setting screen 100. On the setting screen 100, information indicating an item to be corrected (i.e., child's full name 1) is displayed. In a case where the corrector gives a command for using the relevant document A as a second inscription region related to the child's full name 1 on the setting screen 100 (e.g., clicks on a "YES" button), the result comparison unit 22 sets the name inscription field A as a subsequent second inscription region to be compared with the name inscription field 38. For example, information indicating the association between the name inscription field 38 and the name inscription field A is stored in a storage device provided in the image processing apparatus 10. In a subsequent comparison process, the result comparison unit 22 compares the recognition result with respect to the name inscription field 38 with the recognition result with respect to the name inscription field A. Then, a warning mark is displayed in accordance with the comparison result. In other words, the recognition result with respect to the name inscription field A is used as correct data, and the correct data and the recognition result with respect to the name inscription field 38 are compared with each other. Moreover, if the recognition result with respect to the name inscription field 38 and the recognition result (i.e., the correct data) with respect to the name inscription field A do not match in a subsequent process, the confirmation-correction processing unit 24 may correct the recognition result with respect to the name inscription field 38 to the correct data.

By setting the correct data and automatically performing the comparison process and the correction process as described above, the process of selecting the correct data by the corrector is omittable.

The relevant document that includes the name inscription field A may be set as a relevant document to be used in a subsequent comparison process. In this case, the result comparison unit 22 compares the recognition result with respect to the recognition-target document with the recognition result with respect to the relevant document that includes the name inscription field A.

As described above, in a case where the second-inscription-region information 88 is selected by the corrector and the recognition result with respect to the name inscription field 38 is corrected to the recognition result 94, the output unit 26 causes the screen 58 to display information indicating the recognition result on which the correction is reflected. FIG. 11 illustrates a display example. As indicated by reference sign 102, the text string "Minato Fnji" indicated in the recognition result 66 shown in FIG. 7 is corrected to the text string "Minato Fuji" indicated in the recognition result 94 with respect to the name inscription field A. In other words, the text character "n" prior to the correction is corrected to the text character "u".

The warning mark 82 is not displayed after the correction, and a check mark 104 is displayed in the item frame 76 in place of the warning mark 82.

In a case where the certainty factor of a recognition result with respect to a first inscription region is above or equal to the threshold value, an item to be compared by the result comparison unit 22 may be preliminarily set, and the result comparison unit 22 may compare text recognition results with respect to the preliminarily-set item. For example, an attribute (category) to be compared is preliminarily designated by the image inputter or the corrector, and the result comparison unit 22 compares text recognition results with respect to the item having that attribute. Examples of the attribute (category) include "full name", "address", "birthdate", "telephone number", and "ID". Needless to say, an attribute other than these attributes may be used. The result comparison unit 22 compares text recognition results with respect to text (i.e., text belonging to the same category) having the same attribute (i.e., predetermined attribute) in a recognition-target document image and a relevant-document image.

The first recognition processing unit 16 searches for a text string having the predetermined attribute in the recognition-target document image and applies a text recognition process to the text string so as to recognize the text string. For example, in a case where the attribute "full name" is designated, the first recognition processing unit 16 searches for a text string expressing the attribute "full name", such as "full name", "name", and "surname", in the document image, and recognizes a first inscription region linked with the text string (such as a first inscription region disposed near the text string) as a first inscription region having the attribute "name". Then, the first recognition processing unit 16 applies a text recognition process to the first inscription region so as to recognize the text string inscribed in that first inscription region as a text string having the attribute "name".

The second recognition processing unit 20 searches for a text string having the predetermined attribute in the relevant image, and applies a text recognition process to the text string so as to search for the text string. For example, in a case where the attribute "full name" is designated, the second recognition processing unit 20 searches for a text string expressing the attribute "full name", such as "full name", "name", and "surname", in the relevant document, and recognizes a second inscription region linked with the text string (such as a second inscription region disposed near the text string) as a second inscription region having the attribute "name". Then, the second recognition processing unit 20 applies a text recognition process to the second inscription region so as to recognize the text string inscribed or printed in that second inscription region as a text string having the attribute "name".

In a case where the certainty factor of the recognition result (i.e., the result of the recognition process performed by the first recognition processing unit 16) with respect to the text string having the attribute "name" in the recognition-target document image is above or equal to the threshold value, the result comparison unit 22 compares the recognition result with respect to the text string having the attribute "name" in the recognition-target document image with the recognition result (i.e., the result of the recognition process performed by the second recognition processing unit 20) with respect to the text string having the attribute "name" in the relevant document. Similar to the exemplary embodiment described above, if the two recognition results do not match, a warning mark is displayed for the item having the attribute "name". If the two recognition results match, the warning mark is not displayed.

Because a text string having a designated attribute is automatically searched for and recognition results are compared, an image inputter or a corrector does not have to manually designate inscription regions to be compared in the recognition-target document image and the relevant-document image. Moreover, because a text string having a designated attribute is automatically searched for and recognition results are compared even when the formats of the recognition-target document image and the relevant-document image are changed, it is not necessary to manually set the recognition-target inscription regions again.

Each of the image processing apparatus 10 and the terminal apparatus 12 described above is realized in accordance with, for example, hardware and software operating in cooperation with each other. In detail, the image processing apparatus 10 and the terminal apparatus 12 each include one or more processors, such as one or more central processing units (CPUs) (not shown). The one or more processors read a program stored in a storage device (not shown) and execute the program so as to realize the functions of the components included in each of the image processing apparatus 10 and the terminal apparatus 12. The program is stored in the storage device via a recording medium, such as a compact disc (CD) or a digital versatile disc (DVD), or via a communication path, such as a network. As another example, the components of the image processing apparatus 10 and the terminal apparatus 12 may each be realized by a hardware resource, such as a processor, an electronic circuit, or an application specific integrated circuit (ASIC). In order to achieve this, a device, such as a memory device, may be used. As another example, the components of the image processing apparatus 10 and the terminal apparatus 12 may each be realized by a digital signal processor (DSP) or a field programmable gate array (FPGA).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor that is configured to
      acquire a text recognition result with respect to a first image showing a document and a certainty factor indicating a certainty of the text recognition result; and
      confirm the text recognition result if the certainty factor is above or equal to a threshold value; and
   a controller that controls an output of a warning for the text recognition result with respect to the first image in a case where the text recognition result and a text recognition result with respect to a second image showing a relevant document related to the document do not match even when the certainty factor is above or equal to the threshold value,
   wherein the document includes text handwritten by an inscriber, and
   wherein the relevant document is related to the inscriber.

2. The information processing apparatus according to claim 1,
   wherein the document and the relevant document each include a text string for identifying the inscriber.

3. The information processing apparatus according to claim 1,
   wherein the controller controls the output of the warning based on the text recognition result with respect to the first image and a text recognition result with respect to printed text shown in the second image.

4. The information processing apparatus according to claim 1,
   wherein the controller controls the output of the warning based on the text recognition result with respect to the first image and text recognition results with respect to a plurality of second images showing a plurality of relevant documents.

5. The information processing apparatus according to claim 4,
   wherein the plurality of relevant documents are of different types.

6. The information processing apparatus according to claim 4, the processor is further configured to:
   set a relevant document that is included in the plurality of relevant documents and that is used for correcting the text recognition result with respect to the first image as a document used for a comparison with a text recognition result with respect to a subsequent first image.

7. The information processing apparatus according to claim 1,
   wherein the controller controls the output of the warning based on a text recognition result with respect to text having an identical attribute in the first image and the second image.

8. The information processing apparatus according to claim 1,
   wherein in a case where the first image and the second image each have a predetermined attribute, the controller controls the output of the warning for the text recognition result with respect to the first image if the text recognition result with respect to the first image and the text recognition result with respect to the second image do not match even when the certainty factor is above or equal to the threshold value.

9. The information processing apparatus according to claim 1,
   wherein the controller is configured to control that the text recognition result with respect to the first image is corrected according to the text recognition result with respect to the second image.

10. A non-transitory computer readable medium storing a program causing a computer to execute a process, the process comprising:
   acquiring a text recognition result with respect to a first image showing a document and a certainty factor indicating a certainty of the text recognition result;
   confirming the text recognition result if the certainty factor is above or equal to a threshold value; and
   controlling an output of a warning for the text recognition result with respect to the first image in a case where the text recognition result and a text recognition result with respect to a second image showing a relevant document related to the document do not match even when the certainty factor is above or equal to the threshold value, wherein the document includes text handwritten by an inscriber, and wherein the relevant document is related to the inscriber.

11. An information processing method comprising:

acquiring a text recognition result with respect to a first image showing a document and a certainty factor indicating a certainty of the text recognition result;

confirming the text recognition result if the certainty factor is above or equal to a threshold value; and controlling an output of a warning for the text recognition result with respect to the first image in a case where the text recognition result and a text recognition result with respect to a second image showing a relevant document related to the document do not match even when the certainty factor is above or equal to the threshold value, wherein the document includes text handwritten by an inscriber, and wherein the relevant document is related to the inscriber.

* * * * *